(12) United States Patent
Jung et al.

(10) Patent No.: US 9,868,440 B2
(45) Date of Patent: Jan. 16, 2018

(54) AUTO CRUISE CONTROLLER OF VEHICLE AND METHOD THEREOF

(71) Applicant: HYUNDAI MOTOR COMPANY, Seoul (KR)

(72) Inventors: Jae Won Jung, Seoul (KR); Hyeon Seob Kim, Seoul (KR); Sae Kwon Chang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 14/829,563

(22) Filed: Aug. 18, 2015

(65) Prior Publication Data
US 2016/0264138 A1 Sep. 15, 2016

(30) Foreign Application Priority Data
Mar. 11, 2015 (KR) .................. 10-2015-0033814

(51) Int. Cl.
*B60W 30/14* (2006.01)
*B60W 30/02* (2012.01)

(52) U.S. Cl.
CPC ........ *B60W 30/143* (2013.01); *B60W 30/025* (2013.01); *B60W 2510/0657* (2013.01); *B60W 2520/10* (2013.01); *B60W 2710/0666* (2013.01)

(58) Field of Classification Search
None
See application file for complete search history.

(56) References Cited

U.S. PATENT DOCUMENTS 5,663,880 A * 9/1997 Saur .................... B60K 31/047
701/93
8,332,088 B2 12/2012 Saito
(Continued)

FOREIGN PATENT DOCUMENTS

JP 11-301308 A 11/1999
JP 2001-330123 A 11/2001
(Continued)

OTHER PUBLICATIONS

Machine translation of KR 2008089543, Oct. 2008, espacenet.com.*

*Primary Examiner* — John Olszewski
*Assistant Examiner* — David P. Merlino
(74) *Attorney, Agent, or Firm* — McDermott Will & Emery LLP

(57) ABSTRACT

An auto cruise system includes a compensating torque generator, an auto cruise controller, a first calculator, a PI controller, a second calculator, a torque saturator, and a torque command limiter. The compensating torque generator generates a compensating torque based on road conditions. The auto cruise controller detects a time at which a torque limitation is released, and adjusts target speed at that time. The first calculator calculates an error based on a difference between the current speed of the vehicle and the target speed adjusted by the auto cruise controller. The PI controller calculates torque corresponding to the error. The second calculator compensates the torque calculated by the PI controller. The torque saturator defines an upper value and a lower value of the torque compensated by the second calculator. The torque command limiter limits the torque which is physically saturated in the actuator by the available torque saturator.

8 Claims, 6 Drawing Sheets

(56) References Cited

U.S. PATENT DOCUMENTS

| | | | |
|---|---|---|---|
| 8,370,042 B2* | 2/2013 | Tokimasa | B60K 31/00 |
| | | | 701/93 |
| 2004/0040765 A1* | 3/2004 | Satou | B60K 31/04 |
| | | | 180/170 |
| 2010/0063661 A1 | 3/2010 | Saito | |
| 2010/0121549 A1* | 5/2010 | Fukuda | B60W 30/188 |
| | | | 701/93 |
| 2014/0244083 A1 | 8/2014 | Kim | |
| 2015/0217771 A1* | 8/2015 | Kelly | B60W 30/143 |
| | | | 701/93 |
| 2016/0039415 A1* | 2/2016 | Brockley | B60W 30/143 |
| | | | 701/94 |
| 2016/0363068 A1* | 12/2016 | Nozaki | B60W 10/107 |
| 2017/0197619 A1* | 7/2017 | Kelly | B60W 30/143 |

FOREIGN PATENT DOCUMENTS

| | | | |
|---|---|---|---|
| JP | 2008-062894 A | | 3/2008 |
| JP | 2008213727 A | | 9/2008 |
| JP | 2014-169065 A | | 9/2014 |
| KR | 10-2008-0089543 A | | 10/2008 |
| KR | 20080089543 A | * | 10/2008 |
| KR | 10-0887797 A | | 3/2009 |

* cited by examiner

AUTO CRUISE CONTROLLER OF VEHICLE AND METHOD THEREOF

CROSS-REFERENCE TO RELATED APPLICATION

This application is based on and claims the benefit of priority to Korean Patent Application No. 10-2015-0033814, filed on Mar. 11, 2015 in the Korean Intellectual Property Office, the disclosure of which is incorporated herein in its entirety by reference.

TECHNICAL FIELD

The present disclosure relates to an auto cruise controller of a vehicle and a method thereof, and more particularly, to a technology preventing a sharp increase in a torque command occurring at a time at which a torque limitation is released, by dynamically adjusting target speed of an auto cruise at the time at which the torque limitation is released.

BACKGROUND

Recently, various types of driver convenience equipment have been developed, and particularly, an auto cruise controller has already become common and has been mounted in the most vehicles.

The auto cruise controller allows a vehicle to follow a set target speed even in a state in which the driving of an accelerator pedal by a driver is not performed, when the vehicle drives on a highway or the like.

Particularly, when the vehicle drives on uphill road while driving in a constant speed at the set target speed, the auto cruise controller follows the target speed by performing an acceleration control in which an amount of air and an amount of fuel are additionally compensated.

In addition, when the vehicle drives on a downhill road while driving in the constant speed at the set target speed, since the speed of vehicle exceeds the target speed due to acceleration by acceleration of gravity, the auto cruise controller performs a speed limitation through a control of an engine output torque. Here, in a case in which the vehicle does not follow the target speed in spite of the limitation of the engine output torque, the auto cruise controller follows the target speed by performing a brake control or performing a transmission control.

Meanwhile, the vehicle often limits torque of a driving apparatus. For example, the torque of the driving apparatus is limited in various cases such as an available power limiting situation, overheating, a low battery, and the like.

When the torque limiting situation described above is released, since the auto cruise controller according to the related art generates a large torque command in order to increase a current speed of the vehicle up to the target speed, there is problem that the auto cruise controller is hard on a driving system of the vehicle or causes the driver to feel uncomfortable ride comport.

SUMMARY

The present disclosure has been made to solve the above-mentioned problems occurring in the prior art while advantages achieved by the prior art are maintained intact.

An aspect of the present disclosure provides an auto cruise controller of a vehicle and a method thereof capable of preventing a sharp increase in a torque command occurring at a time at which a torque limitation is released, by dynamically adjusting target speed of an auto cruise at the time at which the torque limitation is released.

The object of the present disclosure is not limited to the above-mentioned object, and other objects and advantages of the present disclosure can be appreciated by the following description and will be clearly described by the embodiments of the present inventive concept. In addition, it will be easily known that the objects and advantages of the present disclosure can be implemented by means and a combination thereof shown in the appended claims.

According to an exemplary embodiment of the present inventive concept, an auto cruise controller of a vehicle includes: release time detector configured to detect a time at which a torque limitation is released based on a torque difference, the torque difference defined as a difference between calculated torque $u_r$ and torque u in a torque command. The auto cruise controller also includes a speed adjuster configured to dynamically adjust a target speed of the vehicle using an adjusted value X determined based on the torque difference and a proportional-integral (PI) control gain at the time at which the torque limitation is released.

In certain embodiments, the release time detector may include a torque difference calculator configured to subtract the torque u in the torque command from the calculated torque $u_r$, and the speed adjuster may include an initial speed detector configured to detect which value is larger between a result obtained by subtracting an adjusted value X calculated at a current time (n+1) from an adjusted target speed $\widetilde{x}_d$ calculated at a previous time n, and current speed $\dot{x}$ of the vehicle; a dynamic rate limiter configured to generate the adjusted target speed $\widetilde{x}_d$ based on an initial speed detected by the initial speed detector; a switch configured to selectively transfer set target speed $\dot{x}_d$ to the dynamic rate limiter; and a switch controller configured to control the switch to transfer the initial speed detected by the initial speed detector to the dynamic rate limiter during a threshold time at the time when the torque limitation is released.

According to another exemplary embodiment of the present disclosure, a method of auto cruise control of a vehicle includes: detecting a time at which a torque limitation is released, based on a torque difference, the torque difference defined as a difference between calculated torque $u_r$ and torque u in a torque command; and dynamically adjusting target speed of the vehicle using an adjusted value X determined based on the torque difference and a proportional-integral (PI) control gain at the time in which the torque limitation is released.

In certain embodiments, the method may further includes subtracting, by a torque difference calculator, the torque u in the torque command from the calculated torque $u_r$; detecting, by an initial speed detector, which value is value larger between a result obtained by subtracting an adjusted value X calculated at a current time (n+1) from an adjusted target speed $\widetilde{x}_d$ calculated at a previous time n, and current speed $\dot{x}$ of the vehicle; selectively transferring, by a switch, set target speed $\dot{x}_d$ to a dynamic rate limiter; controlling, by a switch controller, the switch to transfer the initial speed detected by the initial speed detector to the dynamic rate limiter during a threshold time at the time at which the torque limitation is released; and generating, by the dynamic rate limiter, the adjusted target speed $\widetilde{x}_d$ based on the initial speed detected by the initial speed detector.

In another aspect of the present inventive concept includes an auto cruise control system of a vehicle. The system includes a compensating torque generator configured to generate a first torque based on one or more road conditions. An auto cruise controller is configured to detect a time at which a torque limitation is released, based on a torque difference defined as a difference between calculated torque ur and torque u in a torque command, and dynamically adjust a target speed of the vehicle using an adjusted value X determined based on the torque difference and a proportional-integral (PI) control gain at the time at which the torque limitation is released. A first calculator may be configured to determine error by subtracting a current speed of the vehicle from the target speed adjusted by the auto cruise controller. A proportional-integral (PI) controller may be configured to determine torque corresponding to the error determined by the first calculator. A second calculator may be configured to determine a second torque by compensating the torque determined by the PI controller using the first torque generated by the compensating torque generator. An available torque saturator may be configured to physically saturate the second torque in an actuator and define upper and lower values of the second torque. A torque command limiter may be configured to limit the physically saturated second torque and output a new torque command.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, features, and advantages will become clear from the Detailed Description which is described below in detail with reference to the accompanying drawings. Therefore, those skilled in the art to which the present disclosure pertains may easily practice a technical idea of the present disclosure. Further, in describing embodiments of the present inventive concept, in the case in which it is judged that a detailed description of a well-known technology associated with the present disclosure may unnecessarily make the gist of the present disclosure unclear, it will be omitted. Hereinafter, exemplary embodiments of the present inventive concept will be described in detail with reference to the accompanying drawings.

In the present disclosure, the term "torque command" means a command including a torque value.

Figure 1:
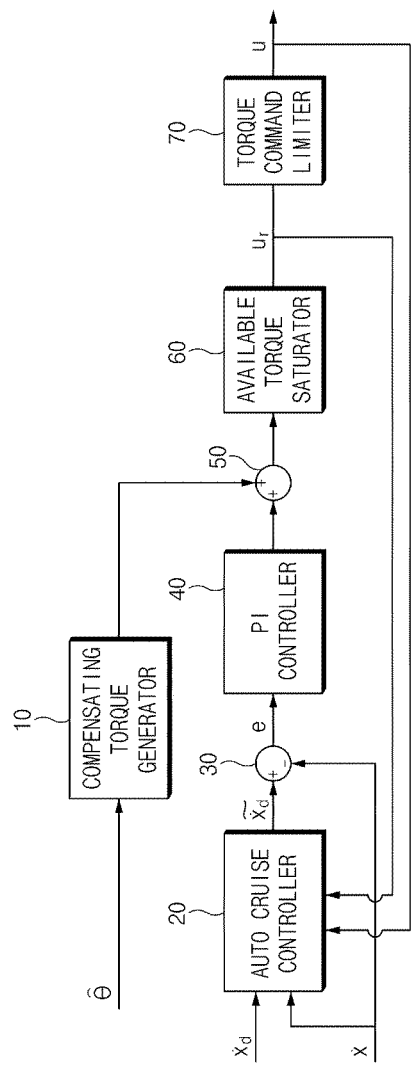
FIG. 1 is a configuration diagram of an example of an auto cruise system applied to the present disclosure.

FIG. 1 is a configuration diagram of an example of an auto cruise system according to an embodiment of the present inventive concept.

As illustrated in FIG. 1, in certain embodiments, an auto cruise system to which the present disclosure is applied includes a compensating torque generator 10, an auto cruise controller 20, a first calculator (subtractor) 30, a proportional-integral (PI) controller 40, a second calculator (summer) 50, an available torque saturator 60, and a torque command limiter 70.

Each of the above-mentioned components will be described. First, the compensating torque generator 10 generates compensating torque based on gradient resistance (an inclination angle $\theta$), air resistance, friction force, and the like, of a road.

Thereafter, the auto cruise controller 20 detects a time at which a torque limitation is released, and adjusts target speed $\dot{x}_d$ of an auto cruise at the time at which the torque limitation is released so as not to cause a driver to feel ride discomfort. In this case, current speed $\dot{x}$ of the vehicle is input to the auto cruise controller 20 and the first calculator 30.

That is, the auto cruise controller 20 decreases the target speed of the auto cruise to an initial speed at the time at which the torque limitation is released and then gradually increases the initial speed up to the target speed. Here, a method of calculating the initial speed will be described below in detail with reference to FIG. 2.

Next, the first calculator 30 calculates error e, which is a result obtained by subtracting the current speed of the vehicle from the target speed (hereinafter, referred to as adjusted target speed $\widetilde{\dot{x}_d}$) adjusted by the auto cruise controller 20.

Next, the PI controller 40 calculates torque corresponding to the error calculated by the first calculator 30.

Next, the second calculator 50 compensates the torque calculated by the PI controller 40 using the compensating torque generated by the compensating torque generator 10. That is, the second calculator 50 sums the torque calculated by the PI controller 40 and the compensating torque generated by the compensating torque generator 10.

Next, the available torque saturator 60, which is a module physically saturating the torque compensated by the second calculator 50 in an actuator, defines an upper value and a lower value of the torque compensated by the second calculator 50.

Next, the torque command limiter 70 limits the torque (hereinafter, referred to as calculated torque $u_r$) which is physically saturated in the actuator by the available torque saturator 60. That is, the torque command limiter 70 decreases the calculated torque to output a torque command. In this case, the torque command includes a torque value u.

Figure 2:
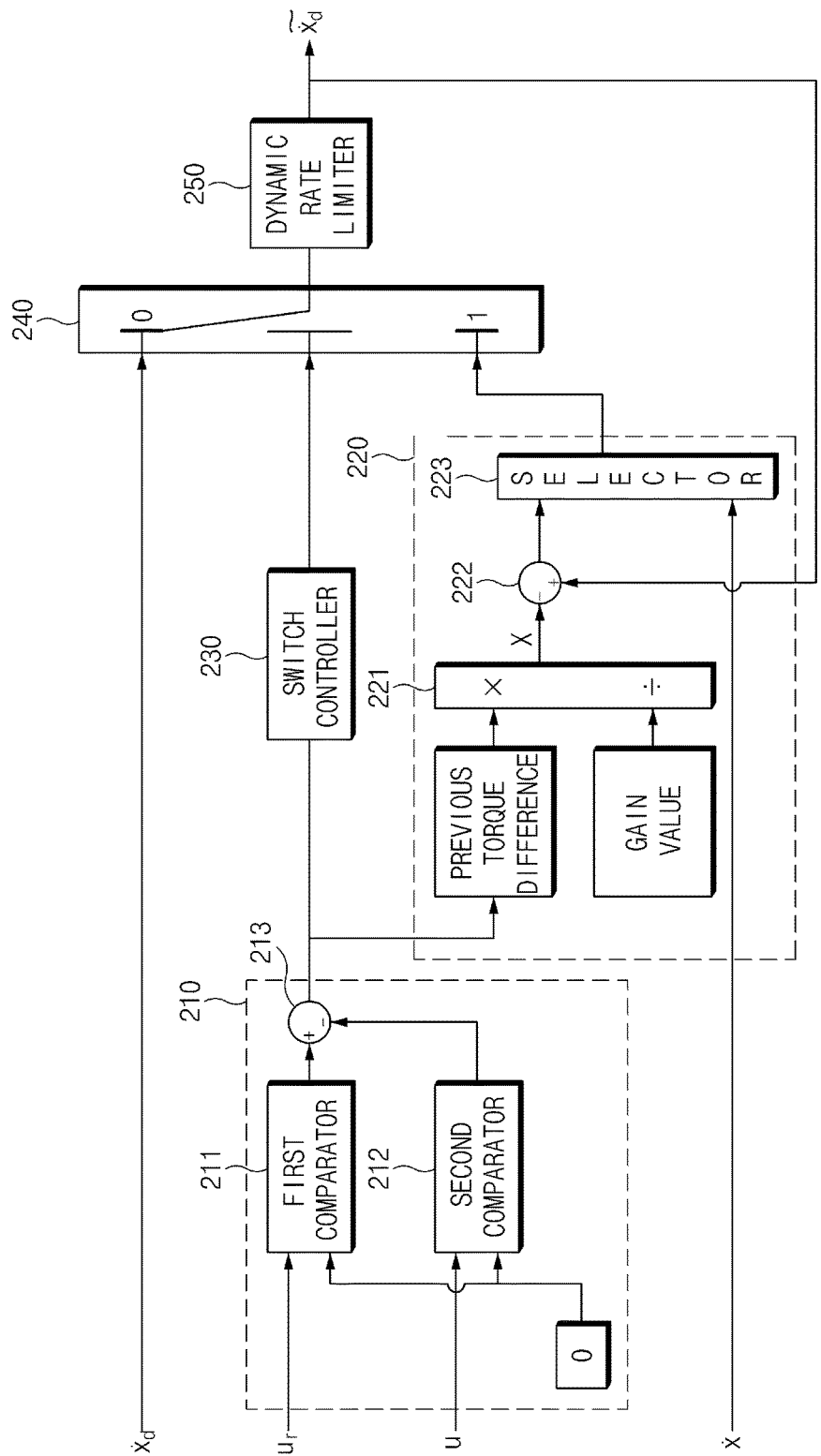
FIG. 2 is a configuration diagram of an example of an auto cruise controller of a vehicle according to the present disclosure.

FIG. 2 is a configuration diagram of an example of an auto cruise controller of a vehicle according to the present disclosure.

As illustrated in FIG. 2, in certain embodiments, the auto cruise controller 20 of the vehicle according to the present disclosure includes a torque difference calculator 210, an initial speed detector 220, a switch controller 230, a switch 240, and a dynamic rate limiter 250.

Each of the above-mentioned components will be described. First, the torque difference calculator 210 performs a calculation in which torque u included in the torque command is subtracted from the calculated torque $u_r$.

That is, the torque difference calculator 210 excludes the calculated torque $u_r$ having a negative value indicating a decrease in torque and torque u in the torque command by subtracting the larger value between the torque u in the torque command and '0' from the larger value between the calculated torque $u_r$ and '0'. In certain embodiments, in this case, the calculated torque $u_r$ generally has a larger value than the torque u in the torque command in a situation in which the torque is limited.

In certain embodiments, the above-mentioned torque difference calculator 210 includes a first comparator 211 outputting the larger value between the calculated value $u_r$ and '0', a second comparator 212 outputting the larger value between the torque in the torque command and '0', and a first subtractor 213 performing a calculation in which the output value of the second comparator 212 is subtracted from the output value of the first comparator 211.

Next, in certain embodiments, the initial speed detector 220 detects the larger value between a result obtained by subtracting an adjusted value X calculated at a current time from an adjusted target speed $\tilde{x}_d$ calculated at a previous time and the current speed $\dot{x}$ of the vehicle. In this case, when it is assumed that the current time is n+1, the previous time is represented by n.

Here, the adjusted value X of the current time n+1 means a value (constant value) obtained by dividing a value $u_{r_n} - u_n$ calculated by the torque difference calculator 210 at the previous time n by a gain $(K_P + K_I)$ of the PI controller 40, as expressed by the following Equation 1.

$$X = \frac{u_{r_n} - u_n}{K_P + K_I} \quad \text{[Equation 1]}$$

In certain embodiments, the initial speed detector 220 includes a calculator 221, a second subtractor 222, and a selector 223.

The calculator 221 calculates the above-mentioned Equation 1.

The second subtractor 222 subtracts the adjusted value X calculated at the current time from the adjusted target speed $\tilde{x}_d$ calculated at the previous time.

The selector 223 selects the larger value between the subtraction result of the second subtractor 222 and the current speed $\dot{x}$ of the vehicle.

Next, in certain embodiments, when the result calculated by the torque difference calculator 210 is 0, that is, the calculated torque $u_r$ and the torque u in the torque command have the same value, the switch controller 230 determines that the torque limitation is released, and controls the switch 240.

That is, the switch controller 230 controls the switch 240 to transfer an output of the initial speed detector 220 to the dynamic rate limiter 250 at the time at which the torque limitation is released and to again return to an original position. In this case, the original position means a position at which a set target speed $\dot{x}_d$ is transferred to the dynamic rate limiter 250.

As a result, the switch controller 230 controls the switch 240 so that the dynamic rate limiter 250 to which the target speed $\dot{x}_d$ is transferred instantaneously receives the output of the initial speed detector 220 at the time at which the torque limitation is released.

Next, the switch 240 transfers the target speed $\dot{x}_d$ or the initial speed detected by the initial speed detector 220 to the dynamic rate limiter 250 under a control of the switch controller 230.

Next, in certain embodiments, the dynamic rate limiter 250 adjusts the target speed $\dot{x}_d$ based on the initial speed detected by the initial speed detector 220. The target speed adjusted as described above is referred to as the adjusted target speed $\tilde{x}_d$.

That is, the dynamic rate limiter 250 changes the initial speed at a predetermined ratio to generate the adjusted target speed $\tilde{x}_d$.

Figure 3:
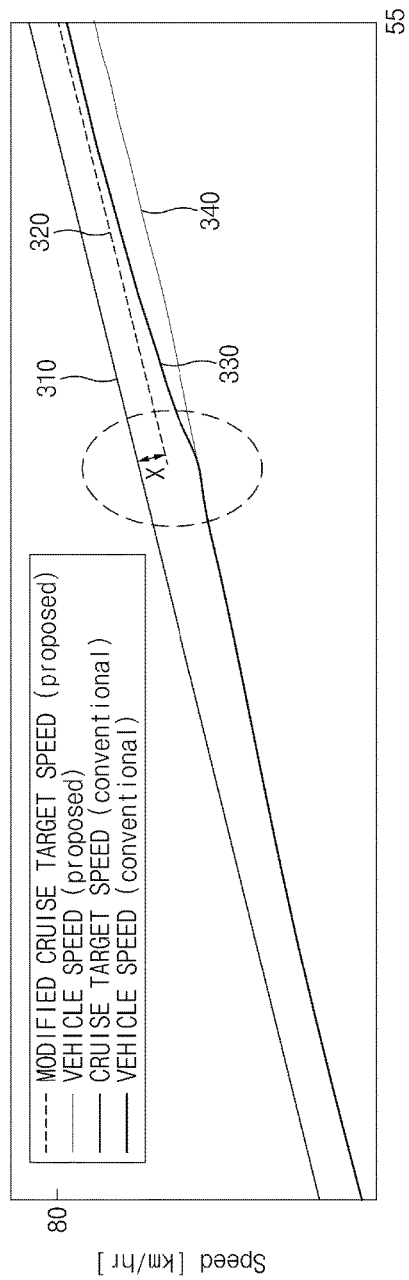
FIG. 3 is an illustrative diagram illustrating a performance analysis result of the auto cruise system to which the present disclosure is applied.
Figure 3:
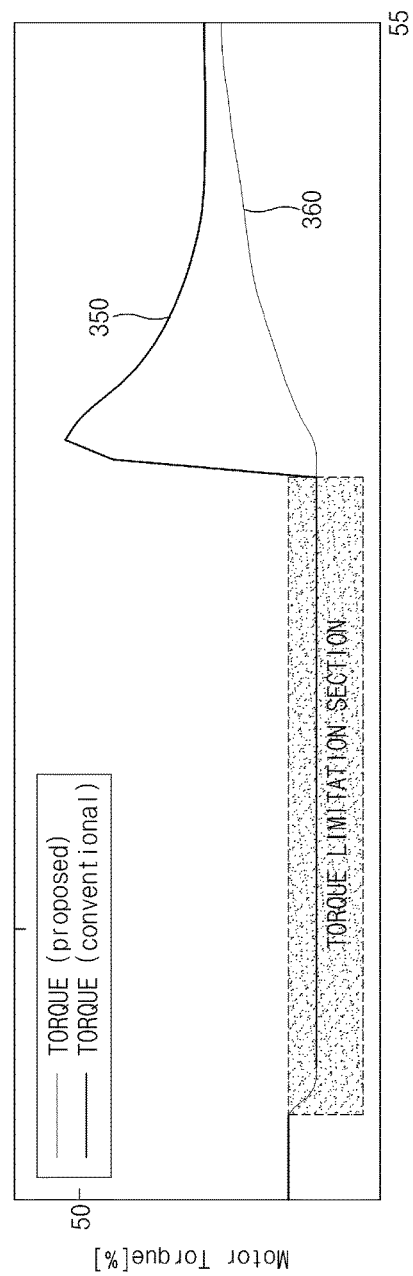

FIG. 3, which is an illustrative diagram illustrating a performance analysis result of the auto cruise system to which the present disclosure is applied, illustrates a case in which the auto cruise system performs a control so as to maintain a predetermined gradient at the time of a resume acceleration driving and have a predetermined falling rate at the time at which the torque limitation is released.

In FIG. 3, reference numeral '310' denotes target speed according to the conventional method, '320' denotes target speed according to a method of an embodiment of the present inventive concept, '330' denotes speed of a vehicle according to the conventional method, '340' denotes speed of a vehicle according to the method of an embodiment of the present inventive concept, '350' denotes torque according to the conventional method, and '360' denotes torque according to the method of an embodiment of the present inventive concept.

It may be seen from FIG. 3 that, in certain embodiments, the target speed according to the method of an embodiment of the present inventive concept is decreased as much as the adjusted value X and is then gradually increased, and the speed of the vehicle is gently increased as compared to the conventional method. In addition, it may be seen that the torque is also gently increased as compared to the conventional method in which the torque is sharply increased at the time at which the torque limitation is released.

Figure 4:
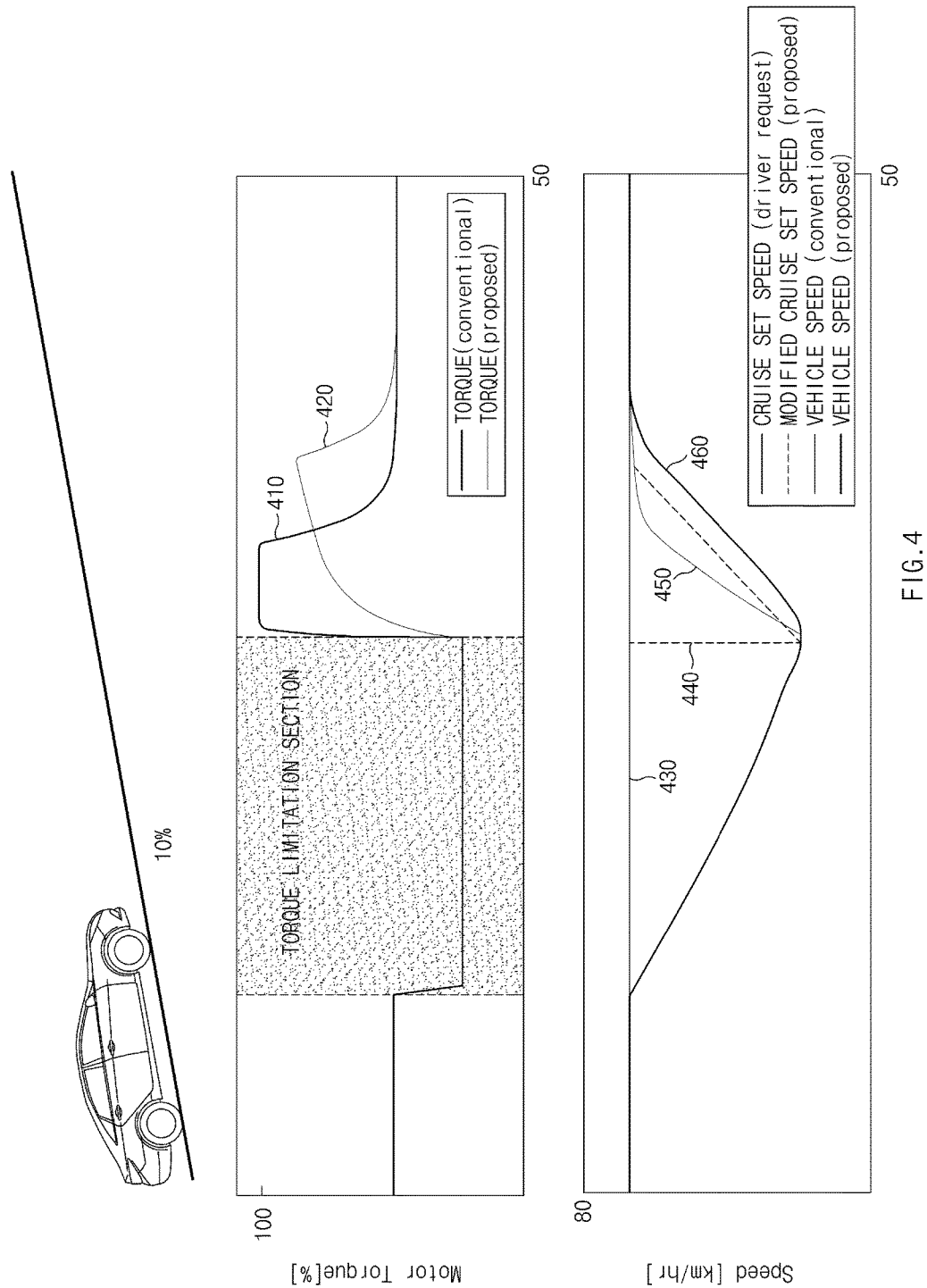
FIG. 4 is another illustrative diagram illustrating a performance analysis result of the auto cruise system to which the present disclosure is applied.

FIG. 4, which is another illustrative diagram illustrating a performance analysis result of the auto cruise system to which the present disclosure is applied, illustrates a case in which the vehicle goes up a slope road of 10%.

In FIG. 4, reference numeral '410' denotes torque according to the conventional method and '420' denotes the torque according to a method of an embodiment of the present inventive concept.

In addition, reference numeral '430' denotes target speed according to the conventional method, '440' denotes target speed according to the method of an embodiment of the present inventive concept, '450' denotes speed of a vehicle according to the conventional method, and '460' denotes speed of a vehicle according to the method of an embodiment of the present inventive concept.

It may be seen from FIG. 4 that the torque 410 according to the conventional method is sharply increased while the torque 420 according to the method an embodiment of the present inventive concept is gently increased at a time at which a torque limitation section is ended.

Figure 5:
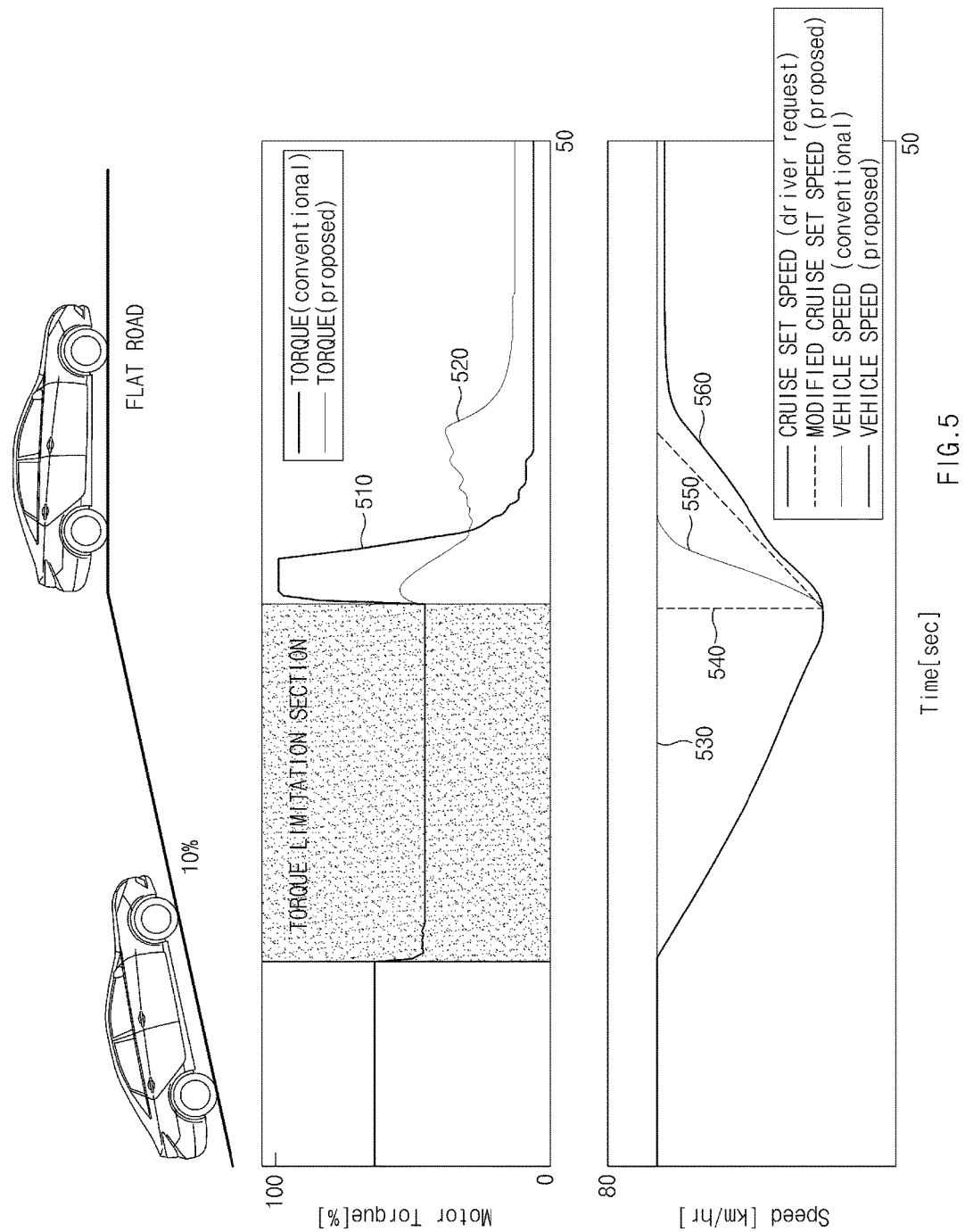
FIG. 5 is another illustrative diagram illustrating a performance analysis result of the auto cruise system to which the present disclosure is applied.

FIG. 5, which is another illustrative diagram illustrating a performance analysis result of the auto cruise system of an embodiment of the present inventive concept, illustrates a case in which the vehicle goes up a slope road of 10% and faces a flat road at the time at which the torque limitation section is ended.

In FIG. 5, reference numeral '510' denotes torque according to the conventional method and '520' denotes the torque according to a method an embodiment of the present inventive concept.

In addition, reference numeral '530' denotes target speed according to the conventional method, '540' denotes target speed according to the method an embodiment of the present inventive concept, '550' denotes speed of a vehicle according to the conventional method, and '560' denotes speed of a vehicle according to the method of an embodiment of the present inventive concept.

It may be seen from FIG. 5 that the torque 510 according to the conventional method is sharply increased while the torque 520 according to the method of an embodiment of the present inventive concept is gently increased at a time at which a torque limitation section is ended.

Figure 6:
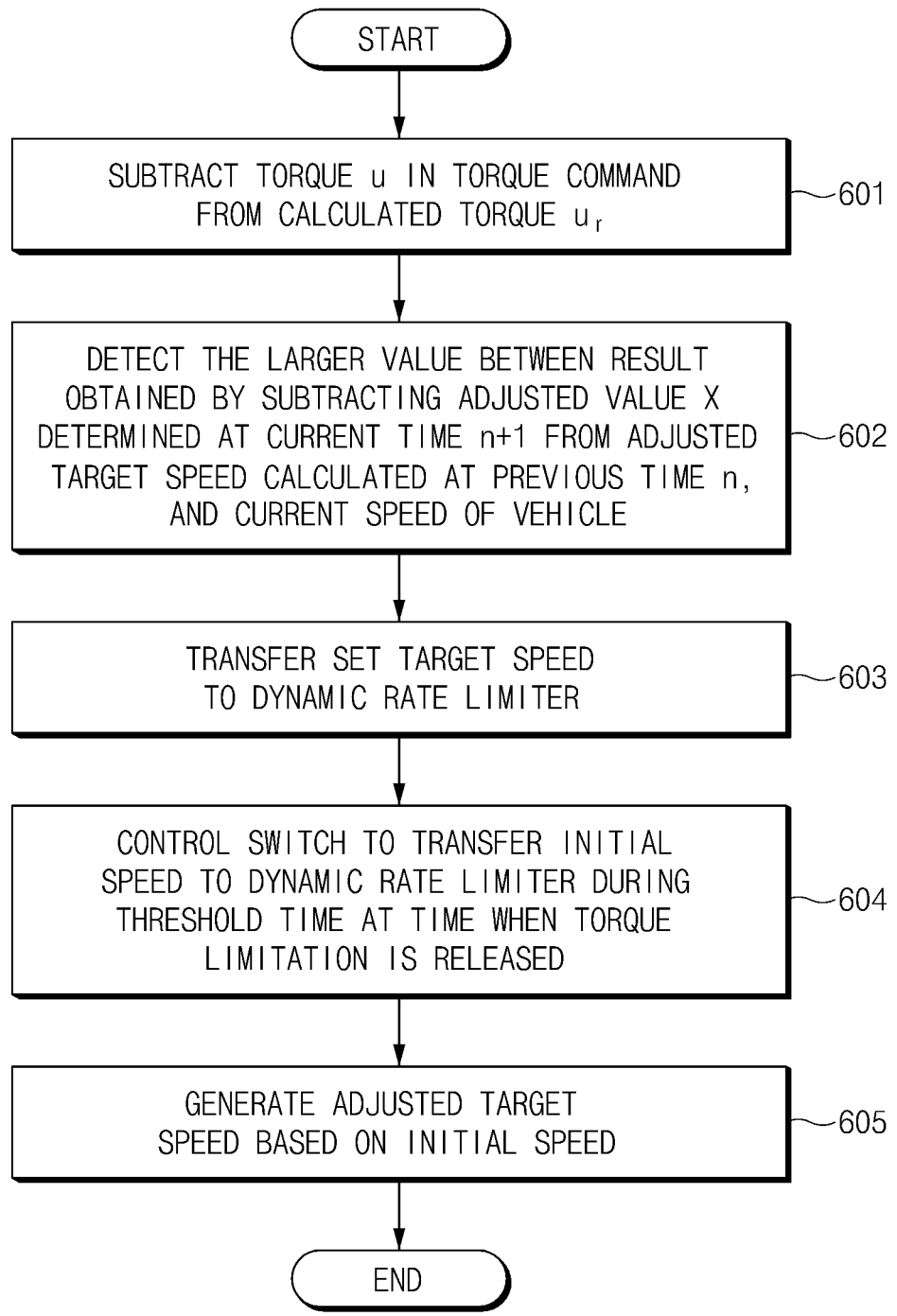
FIG. 6 is a flow chart of an example of a method of an auto cruise control of a vehicle according to the present disclosure.

FIG. 6 is a flow chart of an example of a method of an auto cruise control of a vehicle according to the an embodiment of the present inventive concept.

First, the torque difference calculator 210 subtracts the torque u in a torque command from calculated torque $u_r$ (601). The calculated torque difference as described above is used to determine a time at which the torque limitation is released.

Next, the initial speed detector 220 detects the larger value between a result obtained by subtracting an adjusted value X calculated at a current time (n+1) from an adjusted target speed $\widetilde{x_d}$ calculated at a previous time n and current speed $\dot{x}$ of the vehicle (602).

Next, the switch 240 transfers set target speed $\dot{x}_d$ to the dynamic rate limiter 250 (603).

Next, the switch controller 230 controls the switch 240 to transfer the initial speed detected by the initial speed detector during a threshold time at the time at which the torque limitation is released to the dynamic rate limiter 250 (604).

Next, the dynamic rate limiter 250 generates the adjusted target speed $\widetilde{x_d}$ based on the initial speed detected by the initial speed detector 220 (605).

The present disclosure as described above is characterized that the initial speed is set at various points in time, and the initial speed is differently generated various points in time based on the above-mentioned Equation 1. In certain embodiments, the initial speed is set at every point in time.

As described above, according to the exemplary embodiments of the present disclosure, the sharp increase in the torque command occurring at the time at which the torque limitation is released may be prevented by dynamically adjusting the target speed of the auto cruise at the time at which the torque limitation is released.

In addition, according to the present disclosure, the problem that the auto cruise controller is hard on a driving system of the vehicle or causes the driver to feel ride discomfort may be solved by preventing the sharp increase in the torque command occurring at the time at which the torque limitation is released.

Meanwhile, in certain embodiments, the method according to the present disclosure as described above may be created by a computer program. Codes and code segments configuring the computer program may be easily deduced by computer programmers in the art. In addition, the created computer program is stored in a computer readable recording medium (information storage medium) and is read and executed by computers, thereby implementing the method according to the present disclosure. In addition, the recording medium includes all forms of computer readable recording medium.

The embodiments described above may be variously substituted, altered, and modified by those skilled in the art to which the present inventive concept pertains without departing from the scope and sprit of the present inventive concept. Therefore, the present inventive concept is not limited to the above-mentioned exemplary embodiments and the accompanying drawings.

What is claimed is:

1. An auto cruise controller of a vehicle, the auto cruise controller comprising:
a memory storing computer readable program code; and
a processor configured to execute the computer readable program code, the computer readable program code, when executed by the processor, configuring the processor to:
subtract a torque u in a torque command from a calculated torque $u_r$;
select, as an initial speed, a larger value between (1) a result obtained by subtracting an adjusted value X calculated at a current time (n+1) from an adjusted target speed $\widetilde{x_d}$ calculated at a previous time n, and (2) a current speed $\dot{x}$ of the vehicle;
generate the adjusted target speed $\widetilde{x_d}$ based on the initial speed detected during a threshold time when torque limitation is released, and a set target speed $\dot{x}_d$,
wherein the processor is further configured to determine that the torque limitation is released when a result from subtracting the torque u in the torque command from the calculated torque $u_r$ is 0, and control the vehicle to the adjusted target speed.

2. The auto cruise controller according to claim 1, wherein the processor is further configured to:
output a larger value between the calculated torque $u_r$ and '0' as a first value;
output a larger value between the torque u in the torque command and '0' as a second value; and
subtract the second value from the first value.

3. The auto cruise controller according to claim 1, wherein the processor is further configured to calculate the adjusted value X calculated at the current time (n+1) using the equation $$X = \frac{u_{r_n} - u_n}{K_P + K_I},$$

wherein $u_{r_n} - u_n$ is a torque difference calculated at the previous time n and ($K_P + K_I$) is a proportional-integral (PI) control gain.

4. The auto cruise controller according to claim 3, wherein the processor is further configured to:
subtract the adjusted value X calculated at the current time from the adjusted target speed $\widetilde{x_d}$ calculated at the previous time.

5. A method for auto cruise control of a vehicle, the method comprising:
subtracting, by a torque difference calculator, a torque u in a torque command from a calculated torque $u_r$;
detecting, by an initial speed detector, which value is larger between a result obtained by subtracting an adjusted value X calculated at a current time (n+1) from an adjusted target speed $\widetilde{x_d}$ calculated at a previous time n, and a current speed $\dot{x}$ of the vehicle;
selectively transferring, by a switch, a set target speed $\dot{x}_d$ to a dynamic rate limiter;
controlling the switch, by a switch controller, to transfer the initial speed detected by the initial speed detector to the dynamic rate limiter during a threshold time at the time at which the torque limitation is released;

generating, by the dynamic rate limiter, the adjusted target speed $\widetilde{Xd}$ based on the initial speed detected by the initial speed detector; and controlling the vehicle to the adjusted target speed,
wherein controlling the switch includes determining that the torque limitation is released when a result of subtracting the torque u from the calculated torque $u_r$ is 0.

6. The method according to claim 5, wherein subtracting the torque u in the torque command from the calculated torque $u_r$ includes:

outputting, by a first comparator, a larger value between the calculated torque $u_r$ and '0';

outputting, by a second comparator, a larger value between the torque u in the torque command and '0'; and subtracting, by a first subtractor, the value output by the second comparator from the value output by the first comparator.

7. The method according to claim 5, wherein detecting which value is larger between the result obtained by subtracting the adjusted value X calculated at the current time (n+1) from the adjusted target speed $\widetilde{x_d}$ calculated at the previous time n, and the current speed of the vehicle, the adjusted value X of the current time (n+1) is calculated using the equation $$X = \frac{u_{r_n} - u_n}{K_P + K_I}$$

wherein $u_{r_n} - u_n$ is a torque difference calculated at the previous time n and ($K_P + K_I$) is a proportional-integral (PI) control gain.

8. The method according to claim 7, wherein detecting which value is larger between the result obtained by subtracting the adjusted value X calculated at the current time (n+1) from the adjusted target speed $\widetilde{x_d}$ calculated at the previous time n, and the current speed $\dot{x}$ of the vehicle includes:

calculating, by a calculator, the equation $$X = \frac{u_{r_n} - u_n}{K_P + K_I};$$

subtracting, by a second subtractor, the adjusted value X calculated at the current time from the adjusted target speed $\widetilde{x_d}$ calculated at the previous time; and selecting, by a selector, which value is larger between the subtraction result of the second subtractor and the current speed $\dot{x}$ of the vehicle.

* * * * *